United States Patent [19]
Poynter

[11] Patent Number: 5,221,920
[45] Date of Patent: Jun. 22, 1993

[54] METHOD FOR DETERMINING COLOR TOLERANCING OF DISPLAYS

[75] Inventor: William D. Poynter, Rochester Hills, Mich.

[73] Assignee: General Motors Corporation, Detroit, Mich.

[21] Appl. No.: 627,114

[22] Filed: Dec. 13, 1990

[51] Int. Cl.⁵ .............................................. G09G 1/28
[52] U.S. Cl. ....................................... 340/701; 358/10; 358/101
[58] Field of Search ....................... 340/701, 702, 703; 358/10, 101

[56] References Cited

U.S. PATENT DOCUMENTS

| | | |
|---|---|---|
| 4,414,635 | 11/1983 | Gast et al. |
| 4,653,014 | 3/1987 | Mikami et al. |
| 4,688,178 | 8/1987 | Connelly et al. |
| 4,963,828 | 10/1990 | Kawame et al. ........................ 358/10 |
| 5,033,015 | 7/1991 | Zwirn ................................. 358/10 |
| 5,049,791 | 9/1991 | Kawakami ............................ 358/10 |

OTHER PUBLICATIONS

Brown; "The Effect of Field Size and Chromatic Surroundings on Color Discrimination"; Journal of the Optical Society of America; vol. 42, No. 11; Nov./1952; pp. 837-844.

Douglas Poynter; "The Effects of Again on Perception of Visual Displays"; SAE Technical Paper Series; 881754; Oct./31–Nov./3, 1988; pp. 43-51.

"New Computer Performs Fast Color Tolerance Calculations"; Ind & Eng Chem. vol. 58, No. 5, May 1966, p. 63.

Douglas Poynter, "Variability in Brightness Matching of Colored Lights"; The Human Factor Society, Inc.; 1988, 30(2), pp. 143-151.

Brown et al.; "Visual Sensitivities to Combined Chromaticity and Luminance Differences"; Journal of the Optical Society of America; vol. 39, No. 10; Oct./90, pp. 808-834.

*Primary Examiner*—Ulysses Weldon
*Assistant Examiner*—M. Fatahiyar
*Attorney, Agent, or Firm*—Anthony L. Simon

[57] ABSTRACT

A method for manufacturing displays including a method for determining color tolerances for the displays is set forth. The method comprises the the steps of (i) comparing the display color space data to reference data generally adapted to the size and spatial characteristics of the display, (ii) developing a recommended color value tolerance for the color space data in response to the comparison, and (iii) developing, independent of the recommended color value tolerance, a recommended luminance value tolerance in response to the color space data.

1 Claim, 3 Drawing Sheets

METHOD FOR DETERMINING COLOR TOLERANCING OF DISPLAYS

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

This invention relates to a method of manufacture of displays, and more particularly to a method of determining color tolerances of displays, such as instrumentation displays in vehicles.

BACKGROUND OF THE INVENTION

In designing displays, such as instrumentation displays for automotive vehicles, it is desirable for appearance of a manufactured display to conform to display design. For example, it is frequently the case that all of the numerals and symbols of an automotive instrumentation display are designed to be the same color and brightness (i.e., luminance).

Regardless of the desire of designers, it is generally improbable that a manufacturer will manufacture a display with the exact color and luminance specified by the designer. However, if the display is manufactured with colors and luminance values close enough to the desired color and luminance value, i.e. within a specific tolerance, the display appears to the average observer to have the exact color and brightness desired by the designer.

Many studies have been published on the sensitivity of the human eye to color and brightness. Some of these studies provide data describing sensitivity of the eye to noticeable differences in color. In general, color appearance data can be represented on a three dimensional plot, with the first two dimensions describing the color value and the third dimension describing the luminance value. Typically, studies describe noticeable differences to a target color in the form of an ellipsoidal surface surrounding the target color on the three dimensional plot. See, e.g., Brown and MacAdam, "Visual Sensitivities to Combined Chromaticity and Luminance Differences," *Journal of the Optical Society of America*, vol. 39, no. Oct. 10, 1949.

In actual practice, it is not always clear whether a published work can be used to establish color tolerances for automotive displays because display symbols, such as those found in an instrument panel for a vehicle, differ in size, average luminance, and spatial distribution from the stimuli used in most of the published color discrimination studies. These factors affect the sensitivity of the eye to color and brightness differences. Studies supporting these findings include Poynter, "Color and Brightness Variability in Instrument Panel Appliques," 1987, (OS-33), Warren, Mich.: General Motors Research Laboratories; Poynter, "Variability in Brightness Matching of Colored Lights," *Human Factors*, 1988, 30(2), 143-151; Brown, "The Effect of Field Size and Chromatic Surroundings on Color Discrimination," *Journal of the Optical Society of America*, Vol. 42, No. 11, Nov., 1952; and Cornsweet, *Visual Perception*, 1970, Academic Press, Orlando, Fla., p. 82.

What is desired is a method of manufacture of displays enabling a manufacturer to ensure that manufactured displays appear to observers as designed.

SUMMARY OF THE PRESENT INVENTION

This invention provides a method for manufacturing displays including determining color and luminance (brightness) tolerances for the displays. Using this invention, a designer or manufacturer can input the desired color and luminance values of a display and receive separate tolerance data for the display color value and the display luminance. Additionally, this invention provides an estimation of the percentage of time that an average observer is likely to notice the difference between a display with the maximum allowable tolerance deviation and a display with zero deviation from the design color and luminance.

More particularly, this invention comprises the steps of comparing the display color space data to reference data generally adapted to the size and spatial characteristics of the display, developing a recommended color value tolerance for the color space data in response to the comparison, and developing, independent of the recommended color value tolerance, a recommended luminance value tolerance in response to the color space data. These and other improvements of this invention are set forth in detail below.

DETAILED DESCRIPTION OF THE INVENTION

To determine color space tolerances, this invention makes use of a statistically determined data base which documents perception of color space deviations. The data base contains several ellipses surrounding different target points in color space and is a modification of data taken from a Brown-MacAdam's study (the unmodified data is presented in tabular form in Wyzecki and Stiles, *Color Science*, (1982), New York, N.Y., Wiley & Sons, pp. 793-8). The modification is a scaling factor applied to the average of the data for each ellipse so that it generally corresponds to the size and spatial characteristics of typical vehicle instrumentation displays. Each target point in color space represents a target (e.g., designed) color. The ellipses surrounding the target points define the boundary of 40 percent of the just noticeable distances from the target point. A just noticeable distance is a distance from the target point (e.g., difference in color) at which an average observer first notices the color difference.

The data base corresponds to visual displays comprising characters that can be seen within two visual degrees (e.g., the angle, with the eye at the center, from top to bottom, or from side to side of the character is less than or equal to two degrees; a typical numeral in an instrumentation display is less than one visual degree in height). For characters that comprise ten degrees or greater of the visual field, an appropriately corresponding data base should be used. For example, in the computer implementation of Appendices A and B, although only a 2 degree data base is used, the second and third data sets (marked by 2s and 3s in the first column on page A2) include a 10 degree data base compiled by Brown in 1957 and a 3 degree data base compiled by Wyszecki and Fielder in 1971, respectively, and both are set forth in Wyszecki and Stiles (1982), pp. 799–903. It is noted that different data bases can be compiled and used with this invention, and those data bases may contain ellipses representing the outer boundary of more than or less than 40 percent of the just noticeable distances. However, this invention provides a means for developing different tolerances by applying typical probability distributions and, therefore, it is not necessary to compile separate data.

This invention tolerances luminance separately from color to improve accuracy. Studies support the conclusion that, as displays increase in luminance, acceptable tolerances also increase in proportion. See, Cornsweet (1970). Correspondingly, this invention sets the luminance tolerance at a specific proportion of the display luminance, the proportion being adjustable for different just noticeable differences.

Figure 1:
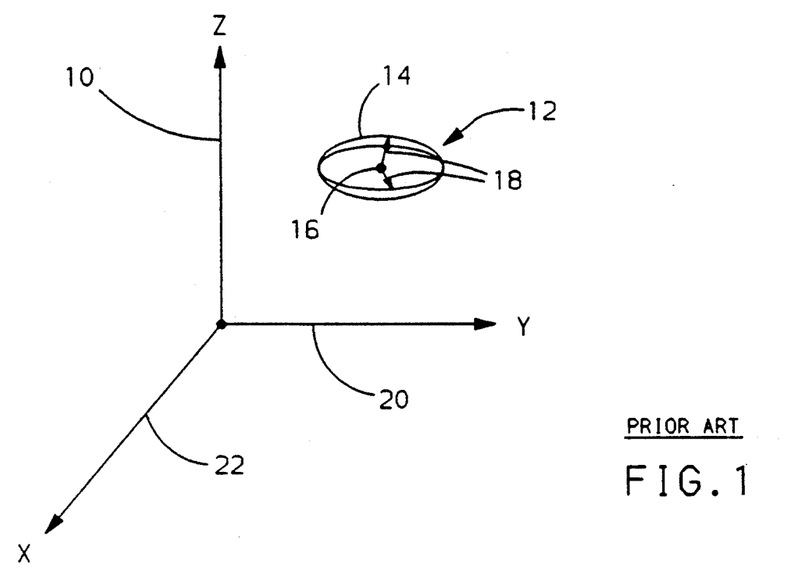
FIG. 1 is a diagram of a three dimensional color coordinate system with a sample ellipsoid as taught by the prior art.

Referring to FIG. 1, conventional color identifying schemes have included identifying whether a color of an object was within an acceptable distance of the target color, and sorted objects in such a manner on the basis of color. The color values are plotted on a three dimensional coordinate system, where the x and y axes 22 and 20 represent the color value of the object, and the z axis 10 represents the luminance value of the object. Reference numeral 12 designates a three dimensional ellipsoid with outer surface 14 which represents the acceptable deviations from the target color, represented by dot 16. Distances 18 represent acceptable color space deviations from target color 16 in the form of three-dimensional distances in the direction of the object color. As can be seen, the treatment of display luminance is intricately tied to color values. Without mathematical adjustment of the luminance dimension (e.g., a log transform), there is no chance to independently tolerance luminance without developing separate ellipsoids for different luminance values or, alternatively assuming a constant luminance tolerance, which is inaccurate in systems where luminance may vary.

Figure 2:
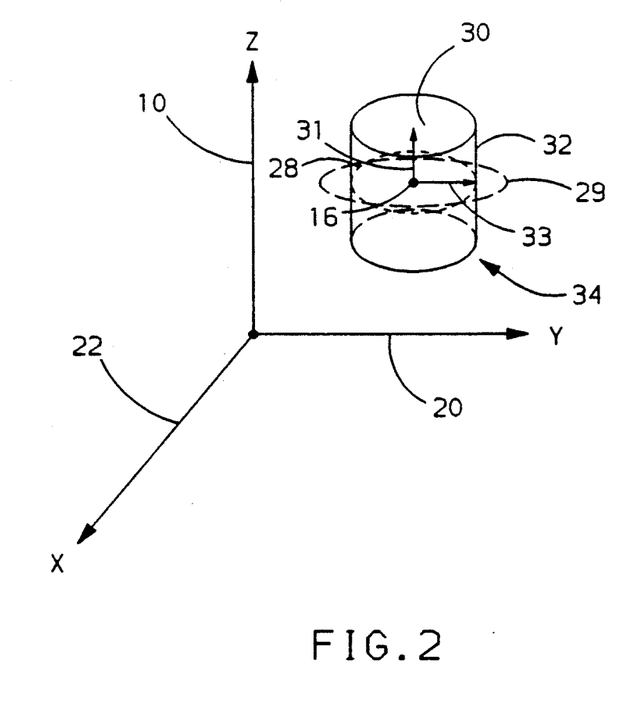
FIG. 2 is a diagram of a three dimensional color coordinate system with a sample cylinder describing color space tolerance according to one aspect of this invention.

According to one aspect of this invention, FIG. 2 shows color values and luminance values toleranced individually. Color values, described by the plot in the directions of the x and y axes, are toleranced as the average distance between the target color 16 and the perimeter of a two dimensional ellipse, 29. Circle 28, parallel to the x-y plane, has a radius which is the average distance between the target color 16 and the perimeter of the two dimensional ellipse 29 and represents the color value tolerance. Arrow 33 represents an example maximum color deviation in one direction of the x-y plane. As can be seen, color value tolerances (x-y plane) are independent of luminance values.

The cylinder side 32, which is parallel to the z axis, represents the luminance tolerance range. The arrow 31 represents an example of maximum luminance deviation parallel to the z-axis. The result of independent treatment of luminance and color tolerances is a tolerance range appearing as cylinder 34, of which circle 28 is a slice. In practice, this allows one ellipse to be used for all possible luminance values.

Because display designs vary a great deal in their luminance specification, it is important to set luminance tolerances that are specifically applicable to the display luminance. There is no one distance in the luminance dimension (z axis in FIG. 2) that defines the difference in luminance that is just noticeable. Instead, for separated stimuli, the just noticeable difference in luminance is a proportion of the luminance specification of the display. This invention preferably uses a 0.15 proportion as the luminance tolerance.

Providing independent color and luminance tolerances specific to the size and spatial separation of instrument display symbols has another important advantage. In the manufacture of common instrumentation displays for automobiles, luminance variability and color variability are often different in severity and caused by different factors. In practical application, then, it is important to monitor and tolerance luminance and color separately in order to isolate components responsible for the deviation of the display from desired appearance specifications. Should the user want to specify a three dimensional tolerance which includes the luminance dimension, the implementation of this invention set forth below also supplies such a tolerance in traditional units of $L^*$, $a^*$, $b^*$ color space.

Figure 3:
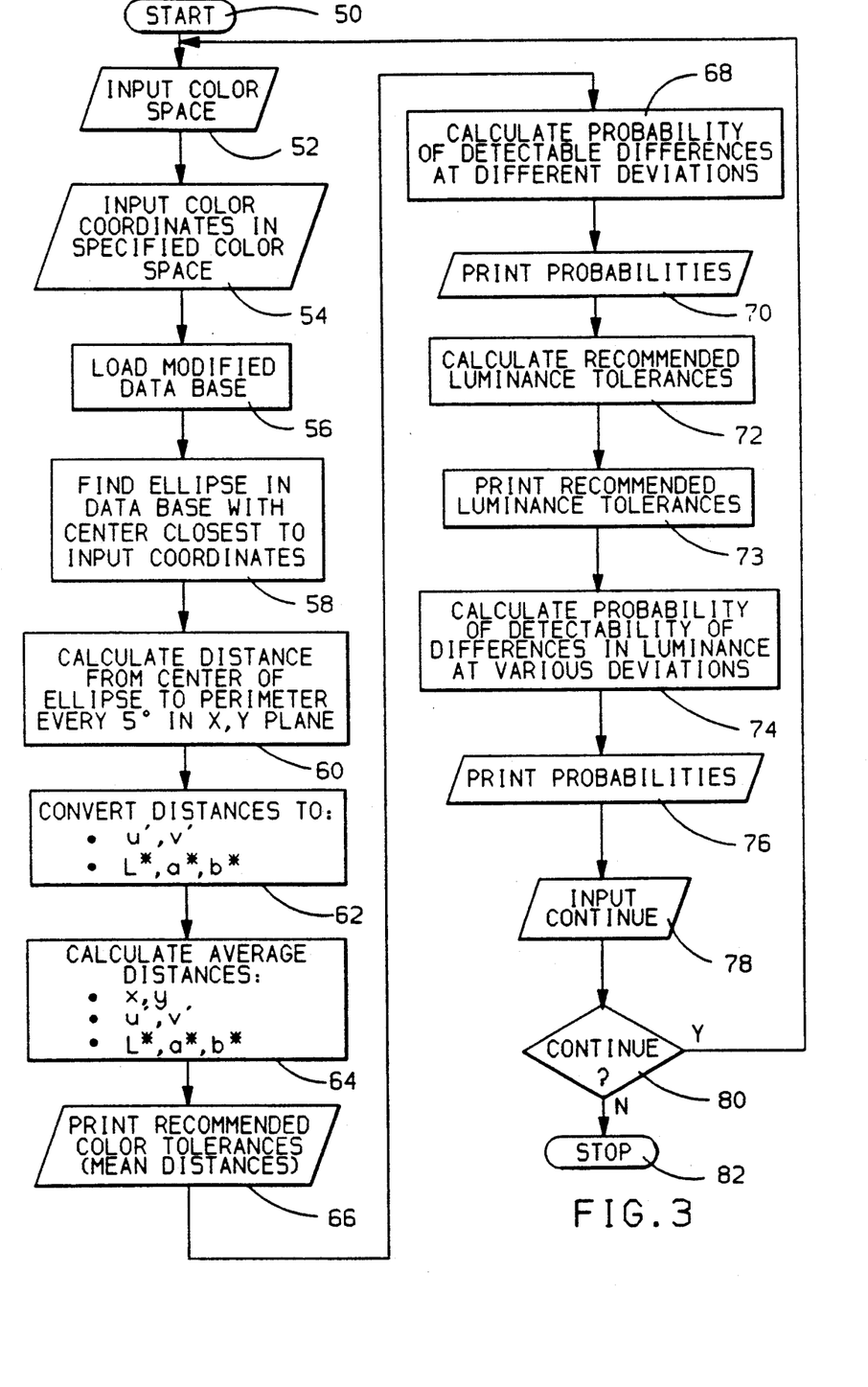
FIG. 3 is a computer flow diagram for one implementation of this invention.

One skilled in the art can easily implement the method of display tolerancing of this invention along with other aspects of this invention according to the computer flow diagram shown in FIG. 3. Appendices A and B contain an example of one software implementation of this invention correlating to the flow diagram of FIG. 3; Appendix A groups the program code into paragraphs corresponding to the flow diagram in FIG. 3 and Appendix B is a straight print out of the program code. The implementation shown in the Appendices is designed to be run on an IBM PC-ATTM compatible computer and is written in BASIC. The program starts at block 50 and moves to block 52 where it requests of the user which color space is to be used (see paragraph 1, Appendix A). Example color spaces known to those skilled in the art include 1931 x, y, Y color space, 1976 u', v', Y color space, and 1976 $L^*$, *, $b^*$ color space (light filters and reflective displays only). In the 1931 x, y, Y color space, x and y correspond to the x-y plane described above and Y corresponds to the z-axis. In the 1976 u', v', Y color space, u' and v' correspond to the x-y plane described above and Y corresponds to the z-axis. In the 1976 $L^*$, $a^*$, $b^*$ color space, neither $a^*$, $b^*$ nor $L^*$ directly correspond to the x, y, and/or z axis described above. However, as described below, 1976 $L^*$, $a^*$, $b^*$ color space coordinates can be converted to color and luminance values.

Figure 4:
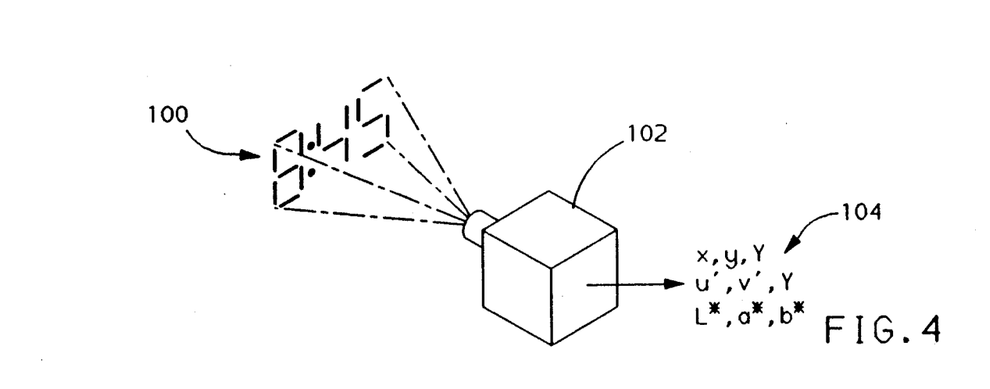
FIG. 4 is an illustration of one example of how color space data for a display is measured.

After the color space is specified at block 52, a user inputs the color coordinates in the specified color space at block 54 (paragraphs 2a, 2b, and 2c in Appendix A). Using any one of a number of available light meters on the market, a designer can determine the color space coordinates from a prototype display which the designer or manufacturer may desire to duplicate. FIG. 4 shows this process. A display 100 is set in focus of light meter/camera 102 which provides the color space coordinates 104 for the prototype display 100 in one or more than one color space (e.g., x, y, Y; u', v', Y; and/or $L^*$, $a^*$, $b^*$). Referring again to FIG. 3, after the color space coordinates are entered, the computer preferably converts x, y color space coordinates into u', v' color space coordinates, if x, y coordinates were entered at block 54, and u', v' coordinates into x, y coordinates, if u', v' coordinates were entered at block 54, so tolerances can be given in both color spaces (see paragraphs 2a–2c, Appendix A). The 1931 x, y color space coordinates are converted into 1976 u', v' coordinates as follows:

$$u' = 4x/(-2x + 12y + 3); \text{ and}$$

$$v' = 9y/(-2x + 12y + 3).$$

The u', v' coordinates are converted into the x, y coordinates as follows:

$$x = (27/4)u'/((9/2)u' - 12v' + 9); \text{ and}$$

$$y = 3v'/((9/2)u' - 12v' + 9).$$

Since the 1976 L*, a*, b* color space is used for light filters and light reflective displays, the tri-stimulus values of the light source X, Y and Z) are required when the L*, a*, b* space is selected by the user, block 52 (see paragraph 2c, Appendix A). Choices A, C, D65, F3, Pipe and VF shown in paragraph 2d of Appendix A represent common light sources for automobile instrument panels, specifically: tungsten lamps, two common forms of sun light, fluorescent lighting, light piping, and vacuum fluorescent lights, respectively, and their tri-stimulus values are programmed into the computer. The user need only choose one. Reference characteristics of other types of illumination can be easily programmed into the computer by one skilled in the art.

The 1976 L*, a*, b* color space coordinates are converted into x, y and u', v' coordinates as follows:

$$x = ((a^*/500) + ((L^* + 16)/116))^3 X/[((a^*/500) + ((L^* + 16)/116))^3 X + ((L^* + 16)/116)^3 Y + (b^*/200 - (L^* + 16)/116)^3(-Z)];$$

$$y = ((L^* + 16)/116)^3 Y/[((a^*/500) + ((L^* + 16)/116))^3 X + ((L^* + 16)/116)^3 Y + (b^*/200 - (L^* + 16)/116)^3(-Z)];$$

$$u' = 4x/(-2x + 12y + 3); \text{ and}$$

$$v' = 9y/(-2x + 12y + 3),$$

see Appendix A, paragraph 2c for an example computer implementation.

Once the x, y and u', v' coordinates are found, the computer moves to block 56 where it loads the data base of color space ellipses used for computing the color tolerances (see paragraphs 3 and 3a, Appendix A). As mentioned above, the data base used according to this invention, shown in Appendix A, paragraph 3a, is a modification of data taken from a Brown-MacAdam's study. According to this invention, the ellipses in the color value plane should be scaled by a factor, thereby accounting for the general size and separation of the symbols of the type of display being designed. For vehicle instrumentation displays, a scale factor of 5.0 is recommended. However, this invention is not so limited and, if statistical data shows a different scale factor should be used for a different type of display, then the scale factor should vary accordingly.

Once the data base is loaded, the computer, at block 58, finds the ellipse in the data base with the center closest to the color space coordinates entered at block 54 (or their equivalents in x, y color space, see paragraph 4, Appendix A). The computer then performs, at blocks 60, 62, and 64, a statistical analysis of the ellipse found at block 58.

The computer performs the statistical analysis by determining, at block 60, the distance from the center of the closest ellipse to the perimeter every 5 degrees in the x-y plane, starting with a line parallel to the x-axis (see Appendix A, paragraph 5). Block 60 calculates the distances in x, y units and block 62 converts the distances into u', v' and, if specified at block 52, L*, a*, b* units (see Appendix A, paragraph 6). Next, the computer computes the averages, in x, y, u',v', and L*, a*, b* units, of the distances found in blocks 60 and 62 (Appendix A, paragraph 7).

The average distance from the center to the perimeter of the ellipse found at block 64 represents the recommended color value tolerance (e.g., x-y plane) for the color space coordinates specified at block 54. The computer next prints the average distances, as the recommended tolerance, at block 66 (see Appendix A, paragraph 8). The significance of the recommended tolerance is that 40 percent of the color discrimination distances about the target color are less than the recommended tolerance for the average observer.

At block 68, the computer estimates the percent of the time that an average observer would notice color difference when the color values of the display vary from the specified color space coordinates by different amounts, both within and out of the tolerance limits (see Appendix A, paragraph 9). Color value noticeable differences are assumed to statistically distribute as a Chi-Square distribution. A sample Chi-Square distribution at various color value differences is programmed into the computer. For example, according to the statistical Chi-Square distribution for color values, if the recommended tolerance (RT) represents 40 percent of the just noticeable differences (JND), then half of the RT represents 22 percent of the JND. Following the distribution, 0.7RT has a 30% JND, 0.9RT has a 36% JND, 1.1RT has a 42% JND, 1.3RT has a 48% JND, 1.5RT has a 53% JND, 1.7RT has a 57% JND, 1.9RT has a 61% JND, 2.1RT has a 65% JND, 2.3RT has a 68% JND, 2.5RT has a 71% JND, 2.7RT has a 74% JND, and 2.9RT has a 77% JND. The computer then prints the estimates at block 70. This information is useful if a tighter or looser tolerance (tighter or looser than 40% JND) is desired for the display or for different portions of the display.

At block 72, the computer calculates the recommended luminance tolerance. In accordance with this invention, luminance tolerance can be treated independently, and block 72 calculates the luminance tolerance at 15 percent of the luminance value of the specified color space coordinates (see Appendix A, paragraph 10). For displays in which tighter or looser luminance tolerances are desired, the percent luminance tolerance should be varied accordingly. The recommended luminance tolerances are printed at block 73 (see Appendix A, paragraph 10).

At block 74, the computer estimates the percent of the time that an average observer would notice luminance difference when the luminance values of the display vary from the luminance specification by different amounts, both within and out of the recommended tolerance limits. The estimated luminance JNDs are calculated along a normal distribution. For example, if the recommended luminance tolerance (RLT) represents 68 percent of the just noticeable differences (JND), then 0.28 of the RLT represents 22 percent of the JND. Following the distribution, 0.38RLT has a 30% JND, 0.47RLT has a 36% JND, 0.56RLT has a 42% JND, 0.64RLT has a 48% JND, 0.72RLT has a 53% JND, 0.79RLT has a 57% JND, 0.86RLT has a 61% JND, 0.94RLT has a 65% JND, 1.0RLT has a 68% JND, 1.1RLT has a 73% JND, 1.3RLT has a 81% JND, 1.6RLT has a 89% JND, and 2.0RLT has a 95% JND. The computer then prints the estimates at block 76. This information is useful if a tighter or looser tolerance tighter or looser than 68% JND) is desired for the display or for different portions of the display.

At blocks 78 and 80, the computer gives the user a chance to continue using the program and either returns to block 52 or stops at block 82.

This invention is useful for displays such as a front lit instrumentation display that reflects light, displays such as those containing light emitting elements, and displays such as back lit instrumentation displays that transmit light. Using this invention with a display that reflects light or transmits light through a filter, the 1976 L*, a*, b* units of the light reflecting material (e.g., paint, molded plastic) or light transmitting filter are entered at block 54. Both of these applications also require the user to specify a standard light source, as described earlier. Using this invention with light emitting displays, it is recommended that 1931 x, y, Y color space or 1976 u', v', Y color space coordinates be used to tolerance the display. If the display has different areas with different color space coordinates (e.g., one or more portions with different colors or different luminances) each area is to be toleranced individually.

Implementing this invention to manufacture displays can improve the quality of the displays produced. By checking (e.g., with a camera that provides color space coordinates) the displays being manufactured against the tolerances developed with use of this invention, a display manufacturer can ensure high manufacturing quality through sorting out displays that do not meet recommended tolerances and adjustment of paint, coloring and lighting processes so that conforming displays are produced. One skilled in the art can alter display coloring processes to conform with the recommended tolerances by, for example, adding proper paint pigments, at the paint steps of the display manufacturing process, as determined by comparing measured color space data with target color space data. Likewise, after comparison of measured color space data with target color space data, one skilled in the art can easily alter luminance to conform with recommended tolerances by adjustment of the light source placement, power, and/or light filter in the display manufacturing processes. This will ensure that manufactured displays appear to observers as designed.

To determine if a display is within the recommended color value tolerance, the Pythagorean theorem is used. Using the $x_c$ and $y_c$ or $u_c'$ and $v_c'$ coordinates taken from the camera (see FIG. 4) that provides the color space coordinates of the display being checked, the distance from the target color (x, y or u', v') is determined as follows:

$$\sqrt{((x_c - x)^2 + (y_c - y)_2)} \text{, or}$$

$$\sqrt{((u_c' - u')^2 + (v_c' - v')^2)}.$$

If the distances found above are less than the tolerance developed according to this invention, then the display is acceptable and the current paint or color process need not be changed.

To determine if a display is within the recommended luminance tolerance, the difference between the camera-measured luminance of the test display and the target luminance is calculated. If the absolute value of the difference found is less than the tolerance developed according to this invention, then the display is acceptable in terms of luminance variation.

Figure 5:
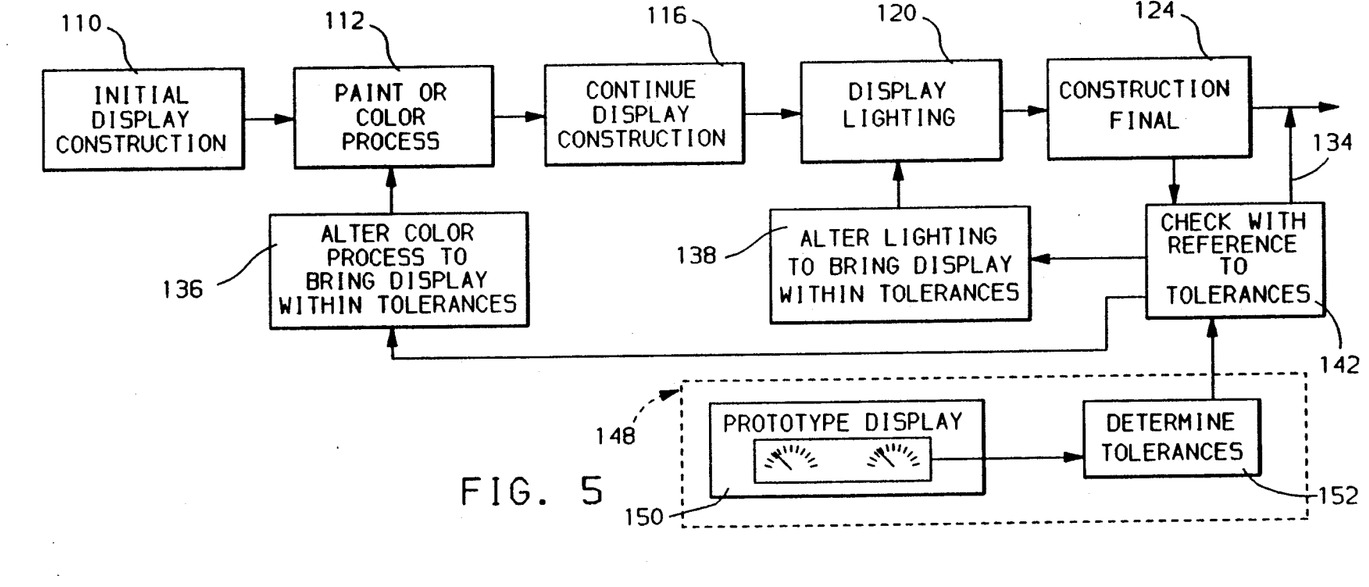
FIG. 5 is a schematic diagram for a display manufacturing process implementing this invention.

The schematic diagram of FIG. 5 is one example of how this invention may be implemented in a manufacturing process for displays. Block 110 represents initial display construction, for any type of display, prior to paint, dye, or other coloring processes. The process moves to block 112, where the display is colored through paint, dye, etc.. After the display is colored, more construction or assembly is generally required, as shown by block 116, before the lighting is placed in the display at block 120. After the lighting is placed in the display, the final construction is completed at step 124.

Block 142 indicates that the final display is checked with reference to color value and luminance tolerances, as described above. The tolerances are developed at block 148 in accordance with invention as described above; for example, a prototype display 150 is toleranced at block 152 to develop separate color value and luminance value tolerances.

If the luminance of the display is not within luminance tolerance specifications, block 138 alters the manufacturing process by which lighting is installed in the display to bring the manufactured displays within luminance tolerances. If the color value of the display is not within color value tolerance specifications, then the color process is altered at block 136 to bring the display color value within color value tolerances. If the display color and luminance is proper at block 142, then no alteration of the manufacturing process is necessary, as indicated by line 134.

The above described implementations of this invention are just examples of how this invention may be implemented and are not limiting on the scope of this invention. Various other improvements and modifications to this invention will occur to those skilled in the art and fall within the scope of this invention as set forth below.

APPENDIX A

LINE NUMBERS 100-150, 200-229

(1) Print     "1=1931 space (x,y,Y)"        if CHOICE = 1 then (2a)
    Print     "2=1976 space (u',v',Y)"         CHOICE = 2 then (2b)
    Print     "3=1976 space (L*,a*,b*)"        CHOICE = 3 then (2c)
    Input     "input choice", CHOICE

LINE NUMBERS 160, 230

(2a)  - input "luminance specification in $cd/m^2$", FFLL
      - input "x,y coordinates", XTRANS, YTRANS REMtransform XTRANS, YTRANS into 1976 u',v' units 
- UTRANS = (4*XTRANS)/(-2*XTRANS + 12*YTRANS +3)
- VTRANS = (9*YTRANS)/(-2*XTRANS + 12*YTRANS + 3)

LINE NUMBERS 240, 290

(2b)  - input "luminance specification in cd/m$^2$", FFLL
- input "u',v' coordinates", UTRANS, VTRANS
REMtransform xtrans, ytrans into 1931 x,y, units 
- XTRANS = ((27/4)*UTRANS) / (9/2)*UTRANS - (12*YTRANS)+9)
- YTRANS = (3*VTRANS) / ((9/2)*UTRANS -(12*VTRANS)+9)

LINE NUMBERS 1510-1564, 1580-1630

(2c)  - input "reference illuminant (A,C,D65,F3,PIPE,VF)", DIL$

- if DIL$ = "A" then LABXN=109.81:LABYN=100:LABZN=35.55
  if DIL$ = "C" then LABXN=98.04:LABYN=100:LABZN=118.12
  if DIL$ = "D65" then LABXN=95.03:LABYN=100:LABZN=108.79
  if DIL$ = "F3" then LABXY=94.97:LABYN=100:LABZN=89.59
  if DIL$ = "PIPE" then LABXN=122.43:LABYN=100:LABZN=17.55
  if DIL$ = "VF" then LABXN=59.27:LABYN=100:LABZN=72.28

- input "L$^*$,a$^*$,b$^*$", LSTAR, ASTAR, BSTAR
- TRIY = ((LSTAR+16)/116)$^3$*LABYN
- TRIX = ((ASTAR/500+(TRIY/LABYN)$^{(1/3)}$)$^3$*LABXN
- TRIZ = ((BSTAR/200-(TRIY/LABYN)$^{(1/3)}$)$^3$*(-1*LABZN)
- XTRANS = TRIX/(TRIX+TRIY+TRIZ)
- YTRANS = TRIY/(TRIX+TRIY+TRIZ)
- UTRANS = (4*XTRANS)/(-2*XTRANS+12*YTRANS+3)
- VTRANS = (9*YTRANS)/(-2*XTRANS+12*YTRANS+3)

LINE NUMBERS 420-490

REMdata set "clr" provided on next page as category 3a 
(3) OPEN "A:CLR" for input as #1
for I = 1 to 87
input #1, SET(I),XCENT(I),YCENT(I), Y(I),Z(I),
       Y2(I), Z2(I),ANGLE2(I),DELTY(I),DELTYOY(I),
       LUM(I)
REM adjust major & minor ellipse axes length 
       Y2(I) = Y2(I)*5/3: Z2(I) = Z2(I)*5/3
       next I (3a)  REM** data set "clr"

| | | | | | | | | | |
|---|---|---|---|---|---|---|---|---|---|
| 1 | 0.171 | 0.189 | 0.00213333 | 0.00063333 | 0.006400 | 0.0019000 | 1.58243 | 0.099502 | 0.039005 | 2.551 |
| 1 | 0.191 | 0.329 | 0.00304667 | 0.00123333 | 0.009200 | 0.0037000 | 1.64443 | 0.049798 | 0.029766 | 1.673 |
| 1 | 0.199 | 0.524 | 0.00526667 | 0.00193333 | 0.015800 | 0.0058000 | 1.68715 | 0.051322 | 0.035394 | 1.450 |
| 1 | 0.203 | 0.414 | 0.00416667 | 0.00153333 | 0.012500 | 0.0046000 | 1.82678 | 0.042594 | 0.027061 | 1.574 |
| 1 | 0.212 | 0.642 | 0.00710000 | 0.00216667 | 0.021300 | 0.0065000 | 1.62315 | 0.035548 | 0.025759 | 1.380 |
| 1 | 0.221 | 0.148 | 0.00176667 | 0.00050000 | 0.005300 | 0.0015000 | 0.93466 | 0.017545 | 0.031900 | 0.550 |
| 1 | 0.249 | 0.204 | 0.00246667 | 0.00080000 | 0.007400 | 0.0024000 | 1.07047 | 0.037905 | 0.041201 | 0.920 |
| 1 | 0.255 | 0.255 | 0.00253333 | 0.00086667 | 0.007600 | 0.0026000 | 1.13446 | 0.048506 | 0.036747 | 1.320 |
| 1 | 0.258 | 0.325 | 0.00260000 | 0.00120000 | 0.007800 | 0.0036000 | 1.21009 | 0.073106 | 0.037490 | 1.950 |
| 1 | 0.268 | 0.322 | 0.00243333 | 0.00094667 | 0.007300 | 0.0029000 | 1.12365 | 0.044665 | 0.032013 | 2.020 |
| 1 | 0.294 | 0.367 | 0.00325000 | 0.00121667 | 0.009750 | 0.0036500 | 1.20719 | 0.043044 | 0.024200 | 5.710 |
| 1 | 0.308 | 0.424 | 0.00303333 | 0.00110000 | 0.009100 | 0.0033000 | 1.15192 | 0.094912 | 0.032173 | 2.950 |
| 1 | 0.310 | 0.288 | 0.00243333 | 0.00086667 | 0.007900 | 0.0024000 | 0.98320 | 0.050433 | 0.027261 | 1.850 |
| 1 | 0.314 | 0.183 | 0.00266667 | 0.00070000 | 0.008000 | 0.0021000 | 0.71558 | 0.030002 | 0.033710 | 0.890 |
| 1 | 0.319 | 0.581 | 0.00425000 | 0.00155000 | 0.012750 | 0.0046500 | 1.47480 | 0.127357 | 0.031063 | 4.100 |
| 1 | 0.321 | 0.491 | 0.00300000 | 0.00133333 | 0.009000 | 0.0040000 | 1.39044 | 0.101034 | 0.020577 | 4.910 |
| 1 | 0.323 | 0.558 | 0.00403333 | 0.00143333 | 0.012100 | 0.0043000 | 1.47771 | 0.185789 | 0.029966 | 6.200 |
| 1 | 0.354 | 0.358 | 0.00260000 | 0.00103333 | 0.007800 | 0.0031000 | 1.82612 | 0.144614 | 0.022918 | 6.310 |
| 1 | 0.358 | 0.230 | 0.00240000 | 0.00090000 | 0.007200 | 0.0027000 | 0.75049 | 0.108005 | 0.029510 | 3.460 |
| 1 | 0.364 | 0.505 | 0.00300000 | 0.00140000 | 0.009000 | 0.0042000 | 1.16937 | 0.220558 | 0.045950 | 4.800 |
| 1 | 0.370 | 0.218 | 0.00256667 | 0.00096667 | 0.007700 | 0.0029000 | 0.63414 | 0.140687 | 0.051159 | 2.750 |
| 1 | 0.383 | 0.489 | 0.00243333 | 0.00133333 | 0.007300 | 0.0040000 | 1.40790 | 0.232552 | 0.031856 | 7.300 |
| 1 | 0.385 | 0.400 | 0.00216667 | 0.00116667 | 0.006500 | 0.0035000 | 0.93446 | 0.168761 | 0.024247 | 6.060 |
| 1 | 0.416 | 0.236 | 0.00243333 | 0.00116667 | 0.007300 | 0.0035000 | 0.66904 | 0.187419 | 0.044730 | 4.190 |
| 1 | 0.422 | 0.330 | 0.00276667 | 0.00130000 | 0.008300 | 0.0039000 | 0.62832 | 0.238949 | 0.041198 | 5.800 |
| 1 | 0.436 | 0.366 | 0.00223333 | 0.00103333 | 0.006700 | 0.0031000 | 0.69451 | 0.076495 | 0.023241 | 3.300 |
| 1 | 0.446 | 0.450 | 0.00196667 | 0.00113333 | 0.005900 | 0.0034000 | 0.69813 | 0.176822 | 0.030487 | 5.800 |
| 1 | 0.473 | 0.317 | 0.00220000 | 0.00110000 | 0.006600 | 0.0033000 | 0.44797 | 0.288150 | 0.026830 | 10.740 |
| 1 | 0.484 | 0.267 | 0.00266667 | 0.00123333 | 0.008000 | 0.0037000 | 0.43633 | 0.052373 | 0.048947 | 1.070 |
| 1 | 0.492 | 0.446 | 0.00200000 | 0.00120000 | 0.006000 | 0.0036000 | 0.45159 | 0.134557 | 0.040166 | 3.350 |

| | | | | | | | | | | |
|---|---|---|---|---|---|---|---|---|---|---|
| 1 | 0.525 | 0.390 | 0.00230000 | 0.00126667 | 0.006900 | 0.0038000 | 0.15706 | 0.113707 | 0.039421 | 2.850 |
| 1 | 0.552 | 0.290 | 0.00276667 | 0.00110000 | 0.008300 | 0.0033000 | 0.32579 | 0.196114 | 0.042634 | 4.600 |
| 1 | 0.580 | 0.341 | 0.00306667 | 0.00143333 | 0.009200 | 0.0043000 | 2.96706 | 0.276909 | 0.051279 | 5.400 |
| 1 | 0.612 | 0.317 | 0.00240000 | 0.00103333 | 0.007200 | 0.0031000 | 3.01942 | 0.208998 | 0.033818 | 6.180 |
| 1 | 0.650 | 0.292 | 0.00253333 | 0.00090000 | 0.007600 | 0.0027000 | 0.08727 | 0.322328 | 0.051988 | 6.200 |
| 1 | 0.668 | 0.317 | 0.00246667 | 0.00133333 | 0.007400 | 0.0040000 | 3.07178 | 0.119550 | 0.048401 | 2.470 |
| 1 | 0.682 | 0.302 | 0.00166667 | 0.00076667 | 0.004400 | 0.0023000 | 2.93215 | 0.394951 | 0.064746 | 6.100 |
| 2 | 0.161 | 0.410 | 0.00324000 | 0.00140000 | 0.009720 | 0.0052200 | 2.72271 | 0.328324 | 0.064377 | 5.100 |
| 2 | 0.196 | 0.293 | 0.00235500 | 0.00161500 | 0.007065 | 0.0048450 | 0.11345 | 0.291108 | 0.059410 | 4.900 |
| 2 | 0.209 | 0.137 | 0.00277000 | 0.00081500 | 0.008310 | 0.0024450 | 1.36136 | 0.241013 | 0.08033 | 3.000 |
| 2 | 0.217 | 0.656 | 0.00620000 | 0.00259500 | 0.018600 | 0.0077850 | 2.23402 | 0.373065 | 0.067830 | 5.500 |
| 2 | 0.254 | 0.458 | 0.00241000 | 0.00138500 | 0.007230 | 0.0041550 | 1.93731 | 0.289667 | 0.065833 | 4.400 |
| 2 | 0.257 | 0.262 | 0.00321500 | 0.00116000 | 0.009645 | 0.0034800 | 0.56723 | 0.215623 | 0.050159 | 4.300 |
| 2 | 0.262 | 0.343 | 0.00185500 | 0.00153000 | 0.005565 | 0.0045900 | 1.11701 | 0.323030 | 0.068730 | 4.700 |
| 2 | 0.270 | 0.549 | 0.00462000 | 0.00213500 | 0.013860 | 0.0064050 | 2.19911 | 0.370894 | 0.074175 | 5.000 |
| 2 | 0.285 | 0.630 | 0.00570500 | 0.00222000 | 0.017115 | 0.0066600 | 1.80641 | 0.435977 | 0.087195 | 5.000 |
| 2 | 0.305 | 0.280 | 0.00257000 | 0.00123500 | 0.007710 | 0.0037050 | 1.14319 | 0.144551 | 0.183595 | 4.600 |
| 2 | 0.308 | 0.307 | 0.00185000 | 0.00144500 | 0.005550 | 0.0043350 | 0.66322 | 0.489892 | 0.081649 | 6.000 |
| 2 | 0.339 | 0.493 | 0.00451500 | 0.00183000 | 0.013545 | 0.0054900 | 1.50098 | 0.814390 | 0.127248 | 6.400 |
| 2 | 0.340 | 0.178 | 0.00314000 | 0.00145500 | 0.009420 | 0.0043650 | 1.29154 | 0.276717 | 0.023254 | 3.300 |
| 2 | 0.352 | 0.352 | 0.00242500 | 0.00157250 | 0.007275 | 0.0047175 | 2.15984 | 0.523065 | 0.063020 | 6.300 |
| 2 | 0.365 | 0.546 | 0.00408500 | 0.00313500 | 0.012255 | 0.0094050 | 2.10312 | 0.364900 | 0.077638 | 4.700 |
| 2 | 0.422 | 0.483 | 0.00442000 | 0.00268000 | 0.013260 | 0.0080400 | 1.82387 | 0.377116 | 0.085705 | 6.400 |
| 2 | 0.426 | 0.219 | 0.00287000 | 0.00152500 | 0.008610 | 0.0045750 | 0.75049 | 0.438434 | 0.097430 | 4.500 |
| 2 | 0.457 | 0.368 | 0.00227000 | 0.00123500 | 0.006810 | 0.0037050 | 1.52716 | 0.431321 | 0.084573 | 5.100 |
| 2 | 0.536 | 0.411 | 0.00337500 | 0.00167500 | 0.010125 | 0.0050250 | 2.87979 | 0.684488 | 0.112211 | 6.100 |
| 2 | 0.5620 | 0.2520 | 0.0022700 | 0.00093000 | 0.00681 | 0.00279 | 0.23562 | 0.301498 | 0.075375 | 4.0 |
| 2 | 0.6430 | 0.3040 | 0.0025700 | 0.00093000 | 0.00771 | 0.00279 | 3.07178 | 0.411699 | 0.100414 | 4.1 |
| 2 | 0.6740 | 0.3080 | 0.0020100 | 0.00076000 | 0.00603 | 0.00228 | 2.95833 | 0.540320 | 0.101947 | 5.3 |
| 3 | 0.2054 | 0.2544 | 0.0036667 | 0.00223333 | 0.01140 | 0.00670 | 1.02974 | 0.114179 | 0.032623 | 3.5 |
| 3 | 0.2295 | 0.2987 | 0.0034667 | 0.00200000 | 0.01040 | 0.00600 | 0.89012 | 0.099511 | 0.028432 | 3.5 |
| 3 | 0.2618 | 0.2912 | 0.0042333 | 0.00140000 | 0.01270 | 0.00420 | 1.12865 | 0.168871 | 0.048249 | 3.5 |
| 3 | 0.2670 | 0.4240 | 0.0062667 | 0.00253333 | 0.01880 | 0.00760 | 1.38463 | 0.117340 | 0.033583 | 3.5 |
| 3 | 0.2730 | 0.3701 | 0.0041000 | 0.00216667 | 0.01230 | 0.00650 | 1.34390 | 0.147559 | 0.042160 | 3.5 |
| 3 | 0.2746 | 0.2551 | 0.0036000 | 0.00123333 | 0.01080 | 0.00370 | 1.01229 | 0.115194 | 0.032912 | 3.5 |
| 3 | 0.2959 | 0.3009 | 0.0031667 | 0.00166667 | 0.00950 | 0.00500 | 1.10537 | 0.104729 | 0.029923 | 3.5 |
| 3 | 0.3022 | 0.4725 | 0.0073667 | 0.00193333 | 0.02210 | 0.00580 | 1.40790 | 0.133182 | 0.038052 | 3.5 |
| 3 | 0.3079 | 0.3595 | 0.0033667 | 0.00183333 | 0.01010 | 0.00550 | 1.13444 | 0.130395 | 0.037256 | 3.5 |
| 3 | 0.3101 | 0.3163 | 0.0031000 | 0.00150000 | 0.00930 | 0.00450 | 1.06465 | 0.113298 | 0.032371 | 3.5 |
| 3 | 0.3144 | 0.3355 | 0.0030000 | 0.00150000 | 0.00900 | 0.00450 | 1.08210 | 0.118977 | 0.033993 | 3.5 |
| 3 | 0.3251 | 0.3325 | 0.0026667 | 0.00150000 | 0.00800 | 0.00450 | 1.12283 | 0.111709 | 0.031917 | 3.5 |
| 3 | 0.3310 | 0.2749 | 0.0041667 | 0.00184667 | 0.01250 | 0.00540 | 0.87848 | 0.123434 | 0.035267 | 3.5 |
| 3 | 0.3425 | 0.5280 | 0.0102333 | 0.00300000 | 0.03070 | 0.00900 | 1.33227 | 0.127778 | 0.036508 | 3.5 |
| 3 | 0.3545 | 0.4518 | 0.0065667 | 0.00213333 | 0.01970 | 0.00640 | 1.22173 | 0.152235 | 0.043667 | 3.5 |
| 3 | 0.3753 | 0.3867 | 0.0052667 | 0.00206667 | 0.01580 | 0.00620 | 0.79703 | 0.116457 | 0.033331 | 3.5 |
| 3 | 0.3822 | 0.3372 | 0.0042667 | 0.00193333 | 0.01280 | 0.00580 | 0.50615 | 0.123077 | 0.035165 | 3.5 |
| 3 | 0.3909 | 0.4375 | 0.0060667 | 0.00230000 | 0.01820 | 0.00690 | 0.80867 | 0.174628 | 0.049894 | 3.5 |
| 3 | 0.4058 | 0.2909 | 0.0050000 | 0.00276667 | 0.01500 | 0.00830 | 0.51196 | 0.134916 | 0.038548 | 3.5 |
| 3 | 0.4382 | 0.3417 | 0.0038000 | 0.00213333 | 0.01140 | 0.00640 | 1.21591 | 0.119280 | 0.034080 | 3.5 |
| 3 | 0.4458 | 0.4809 | 0.0071333 | 0.00286667 | 0.02140 | 0.00860 | 0.88430 | 0.156728 | 0.044779 | 3.5 |
| 3 | 0.4650 | 0.3122 | 0.0059333 | 0.00310000 | 0.01780 | 0.00930 | 1.16937 | 0.149610 | 0.042744 | 3.5 |
| 3 | 0.4786 | 0.4327 | 0.0043333 | 0.00260000 | 0.01900 | 0.00780 | 0.54432 | 0.143531 | 0.046723 | 3.5 |
| 3 | 0.4873 | 0.3994 | 0.0060000 | 0.00256667 | 0.01800 | 0.00770 | 0.31616 | 0.122813 | 0.035090 | 3.5 |
| 3 | 0.4932 | 0.3462 | 0.0064333 | 0.00186667 | 0.01990 | 0.00560 | 2.25167 | 0.114734 | 0.032721 | 3.5 |
| 3 | 0.5242 | 0.3140 | 0.0072333 | 0.00323333 | 0.02170 | 0.00970 | 1.09374 | 0.185278 | 0.052937 | 3.5 |
| 3 | 0.5428 | 0.3776 | 0.0043667 | 0.00300000 | 0.01910 | 0.00900 | 0.08145 | 0.130048 | 0.037156 | 3.5 |
| 3 | 0.5868 | 0.3360 | 0.0079333 | 0.00270000 | 0.02380 | 0.00810 | 2.87112 | 0.183023 | 0.052292 | 3.5 |

LINE NUMBERS 320-360

(4) REM set distance criterion variable to arbitrarily high value
SMALLD = 200
for I = 1 to 37
REM first 37 entries in database are Brown-MacAdam's ellipses
DISTX = XTRANS - XCENT(I) : DISTY = YTRANS - YCENT(I)
DTCXY = (DISTX$^2$ + DISTY$^2$)$^{(.5)}$
if DTCXY <SMALLD then SMALLD = DTCXY : CNT=I
next I

LINE NUMBERS 520-690

(5) REM** estimate average distance from center of ellipse to its
perimeter in 72 directions -- ellipse centered at (XTRANS,YTRANS)
and has major, minor axes and orientation angle equal to values of
closest ellipse to (XTRANS,YTRANS)**

TIC=0
for I=0 to 355 step 5
THETA=I* Π/180 : PTEST 1=1 : BUG = Z2(CNT) - .0002
TSIN = SIN(THETA) : TCOS=COS(THETA)
TIC = TIC+1 while PTEST1

REM** move out from center of ellipse in steps of .0002 color space units, calculate x,y coordinates, determine whether point is outside
ellipse perimeter -- if so end loop **

```
IF ABS(TCOS)<=.71 AND I>0 AND I<90 THEN XTEST=(TCOS/TSIN)*BUG:YTEST=BUG
   go to 690
IF ABS(TCOS)>.71 AND I>0 AND I<90 THEN XTEST=BUG:YTEST=(TSIN/TCOS)*BUG
   go to 690
IF ABS(TCOS)<=.71 AND I>90 AND I<180 THEN XTEST=(TCOS/TSIN)*BUG:YTEST=BUG
   go to 690
IF ABS(TCOS)>.71 AND I>90 AND I<180 THEN XTEST=-1*BUG:YTEST= -1*(TSIN/TCOS)
   *BUG: go to 690
IF ABS(TCOS)<=.71 AND I>180 AND I<270 THEN XTEST= -1*(TCOS/TSIN)*BUG:YTEST=
   -1*BUG: go to 690
IF ABS(TCOS)>.71 AND I>180 AND I<270 THEN XTEST= -1*BUG:YTEST=-1*(TSIN/TCOS)
   *BUG: go to 690
IF ABS(TCOS)<=.71 AND I>270 THEN XTEST= -1*(TCOS/TSIN)*BUG:YTEST=-1*BUG
   go to 690
IF ABS(TCOS)>.71 AND I>270 THEN XTEST=BUG:YTEST=(TSIN/TCOS)*BUG
   go to 690
IF I=0 THEN XTEST=BUG:YTEST=0:
   go to 690
IF I=180 THEN XTEST= -1*BUG:YTEST=0
   go to 690
IF I=90 THEN XTEST=0:YTEST=BUG
   go to 690
IF I=270 THEN XTEST=0:YTEST=-1*BUG
   go to 690
690 THEDIST = (XTEST² + YTEST²)^(.5)
```

LINE NUMBERS 700-840, 850-870

(6)   REM calculate point location in u'v' space 
```
UUU = XTEST*COS(ANGLE2(CNT))-YTEST*SIN(ANGLE2(CNT))+XTRANS
VVV = XTEST*SIN(ANGLE2(CNT))+YTEST*COS(ANGLE2(CNT))+YTRANS
UVXTEST = (4*UUU)/(-2*UUU+12*VVV+3)
UVYTEST = (9*VVV)/(-2*UUU+12*VVV+3)
```

REM** if working in L*a*b* units calculate point location and distance
from ellipse center in this space **

```
TRIYT = TRIY :TRIXT = (UUU/VVV)*TRIYT.
TRIZT = ((1-UUU-VVV)/VVV)*TRIYT
IF TRIZT<0 THEN TRIZT=0
LSTEST = 116*(TRIYT/LABYN)^(1/3)-16
ASTEST = 500 *((TRIXT/LABXN)^(1/3) - (TRIYT/LABYN)^(1/3))
BSTEST = 200*((TRIYT/LABYN)^(1/3) - (TRIZT/LABZN)^(1/3))
NWTRIY = TRIY*.15+TRIY
NWLSTAR = 116*(NWTRIY/LABYN)^(1/3)
DELTLS = ABS(NWLSTAR-LSTAR)
LABDE = ((ASTAR-ASTEST)² +(BSTAR-BSTEST)²)^.5
UVDIST = ((UVXTEST-UTRANS)²+(UVYTEST-VTRANS)²)^.5
P2 = (XTEST)²/(Y2(CNT))² + (YTEST)²/(Z2(CNT))²
IF P2>=1 THEN PTEST1=0
BUG = BUG + .0002
WEND
DXY(TIC) = THEDIST:DUV(TIC)=UVDIST:DLAB(TIC)=LABDE
ASTR(TIC)= ABS(ASTAR-ASTEST):BSTR(TIC)=ABS(BSTAR-BSTEST)
DLAB2(TIC)=LABDE2
NEXT I
```

LINE NUMBERS 880-941

(7)   REM* calculate average distance

```
SUMXY=0:SUMUV=0:SUMLAB:=0:SUMAS=0:SUMBS=0
SUMLB2=0
FOR I=1 TO 72
SUMXY=SUMXY + DXY(I):SUMUV=SUMUV+DUV(I):SUMLAB=SUMLAB+DLAB(I)
SUMAS=SUMAS+ASTR(I):SUMBS=SUMBS+BSTR(I):SUMLB2=SUMLB2+DLAB2(I)
NEXT I
DXYAVG=SUMXY/72:DUVAVG=SUMUV/72:DLABAVG=SUMLAB/72
ASTRAV=SUMAS/72:BSTRAV=SUMBS/72:DLBAVG2=SUMLB2/72
```

LINE NUMBERS 970-1160

(8)
```
        FOR I = 1 TO 13:READ ZZ(I),CHISQ(I):NEXT I
        DATA .5,22,.7,30,.9,36,1.1,42,1.3,48,1.5,53,1.7,57
        DATA 1.9,61,2.1,65,2.3,68,2.5,71,2.7,74,2.9,77
        F31X$=".### , ":F31Y$=".####"
        LPRINT "1931 x,y SPECIFICATION = ";
        LPRINT USING F31X$;XTRANS;
        LPRINT USING F31Y$;YTRANS
        LPRINT "1976 u',v' SPECIFICATION = ";
        LPRINT USING F31X$;UTRANS;
        LPRINT USING F31Y$;VTRANS
        IF CHOICE<3 THEN 1110
        LPRINT "1976 L*,a*,b* SPECIFICATION = ";
        LPRINT USING "###.#, ";LSTAR;
        LPRINT USING "###.#, ";ASTAR;
        LPRINT USING "###.#";BSTAR
        LPRINT "Source Illuminant = ";DIL$
1110    LPRINT:LPRINT "THE AVERAGE XY DISTANCE = ";
        LPRINT USING " #.####"; DXYAVG
        LPRINT:LPRINT "THE AVERAGE UV DISTANCE = ";
        LPRINT USING " #.####";DUVAVG
        IF CHOICE<3 THEN 1170
        LPRINT:LPRINT "THE AVERAGE a*b* DELTA E = ";
        LPRINT USING " ##.##";DLABAVG
1170    REM
        LPRINT:LPRINT
```

LINE NUMBERS 1180-1300, 1700-1900

(9)
```
        LPRINT "THE FOLLOWING LIST PROVIDES AN ESTIMATE OF THE PERCENT OF"
        LPRINT "THE TIME THAT THE GIVEN COLOR DIFFERENCE WILL BE SEEN BY"
        LPRINT "AN AVERAGE OBSERVER."
        LPRINT:LPRINT
        IF CHOICES=3 THEN 1700
        LPRINT " DISTANCE (xy)    DISTANCE (uv)    PERCENT"
        LPRINT "                                           "
        FF1$=" .####":FF2$="      .####":FF3$="      ##. %"
        LPRINT USING FF1$; DXYAVG*ZZ(I);
        LPRINT USING FF2$; DUVAVG*ZZ(I);
        LPRINT USING FF3$;CHISQ(I)
        NEXT

1700    REM
        LPRINT " DISTANCE (a*b* color plane)    PERCENT"
        LPRINT "                                        "
        FF1$=" ##.##":FF3$="                  ##.%"
        FOR I=1 TO 13
        LPRINT USING FF1$;DLABAVG*ZZ(I);
        LPRINT USING FF3$;CHISQ(I)
        NEXT
        LPRINT "average a* distance = ";
        LPRINT USING " ##.##";ASTRAV
        LPRINT "average b* distance = ";
```

```
      LPRINT USING " ##.##";BSTRAV
      LPRINT
      LPRINT USING "OVERALL L*a*b* DELTA E VALUE = ##.#";DLBAVG2
```
LINE NUMBERS 1310-1347

(10)
```
      FOR I TO 14;READ ZZL(I),NORM(I):NEXT I
      DATA .28,22,.38,30,.47,36,.56,42,.64,48,.72,53,.79,57
      DATA .86,61,.94,65,1.0,68,1.10,73,1.3,81,1.6,89,2.0,95
      LPRINT:LPRINT
      IF CHOICE=3 THEN 1460 :REM ** IF WORKING IN l*a*b* UNITS **
      LPRINT USING "LUMINANCE SPECIFICATION = ###.##"; FFLL
      LPRINT USING "RECOMMENDED LUMINANCE TOLERANCE = ###.##";FFLL*.15
```

```
1460  NWTRIY=TRIY*.15+TRIY
      NWLSTAR=116*(NWTRIY/LABYN)^(1/3) - 16
      DELTLS=ABS(NWLSTAR-LSTAR)
      LPRINT USING "average luminance distance (L* units) = ##.#";DELTLS
```

LINE NUMBERS 1350-1460

(11)
```
      LPRINT "THE FOLLOWING LIST PROVIDES AN ESTIMATE OF THE PERCENT OF"
      LPRINT "THE TIME THAT THE GIVEN LUMINANCE DIFFERENCE WILL BE DETECTED"
      LPRINT "BY AN AVERAGE OBSERVER"
      LPRINT:LPRINT
      LPRINT "   LUMINANCE DIFFERENCE (cd/m^2)        PERCENT"
      LPRINT  ___________________________________     _________
      FF1$="   ####.##":FF3$="                        ##. %"
      FOR I=1 TO 14
      LPRINT USING FF1$; FFLL*.15*ZZL(I);
      LPRINT USING FF3$;NORM(I)
      NEXT
      CLS
```

LINE NUMBERS 1470-1500

(12)
```
      PRINT:INPUT "DO YOU WISH TO INPUT ANOTHER SPECIFICATION?",ANS$
      IF ANS$="NO" OR ANS$="N" OR ANS$="n" THEN 1500
      DUMMY=1:CLS:RUN "a:color2"
 1500 END
```

APPENDIX B

```
0 SCREEN 2
10 CLS
20 KEY OFF:LOCATE 25,1:PRINT "** color tolerancing program - ";
30 PRINT "refer questions to Doug Poynter 8-226-1346 **"
40 CHOICE$(1)="x,y coordinates":CHOICE$(2)="u,v coordinates"
45 CHOICE$(3)="L*,a*,b* coordinates"
50 REM
60 DIM NMES(30),DXY(100),DUV(100),DLAB(100),Z(13),CHISO(13)
65 DIM ASTR(100), BSTR(100),DLAB2(100)
70 DIM SE1(90),XCEN1(90),YCEN1(90),Y(90),Z(90),Y2(90),Z2(90),ANGLE2(90),DELTY(90
),DELTYOY(90),LUM(90)
80 DIM ZZL(15),NORM(15)
90 LOCATE 12,20,0
100 PRINT "this is a program for computing color tolerances"
110 LOCATE 14,20,0:PRINT " choose the CIE space you wish to work in:"
120 LOCATE 16,20,0:PRINT "1 = 1931 space (x,y,Y)"
130 LOCATE 17,20,0:PRINT "2 = 1976 space (u',v',Y)"
140 LOCATE 18,20,0:PRINT "3 = 1976 space (L*,a*,b*)"
150 LOCATE 19,20,1:INPUT "input choice here ", CHOICE
155 IF CHOICE=3 THEN 190
160 CLS:LOCATE 14,20,0:PRINT "enter the luminance specification in cd/m^2"
170 LOCATE 16,30,0:INPUT " ",FFLL
180 CLS:LOCATE 14,20,0:PRINT "enter the " CHOICE$(CHOICE)" below (e.g.,.234,.345
)"
190 LOCATE 16,30,0
200 IF CHOICE=3 THEN 1510
210 IF CHOICE=2 THEN 240
220 IF CHOICE=1 THEN 230
230 INPUT " ", X,Y:XTRANS=X:YTRANS=Y:GOTO 250
```

```
240 INPUT " ",U,V:UTRANS=U:VTRANS=V:GOTO 290
250 REM *** if '31 units find '76 units, and vice versa***
260 REM *** '76 from '31 ***
270 UTRANS=(4*X)/(-2*X + 12*Y + 3):VTRANS=(9*Y)/(-2*X + 12*Y +3)
280 GOTO 300
290 XTRANS=((27/4)*U)/((9/2)*U-(12*V)-9):YTRANS=(3*V)/((9/2)*U-(12*V)-9)
300 REM *** search the data base for the closest ellipse ***
310 SMALLD=200: GOSUB 410
320 FOR I=1 TO 37
330 DISTX=XTRANS-XCENT(I):DISTY=YTRANS-YCENT(I):DTCXY=(DISTX^2 + DISTY^2)^.5
340 IF DTCXY<SMALLD THEN SMALLD=DTCXY:CNT=I
350 REM
360 NEXT I
370 REM *** CALCULATE AVERAGE DISTANCE AROUND ELLIPSE ***
380 LOCATE 25,1:PRINT "** color tolerancing program - ";
390 PRINT "refer questions to Doug Poynter 6-226-1346 **"
400 GOSUB 510
410 IF DUMMY=1 THEN 320 ELSE CLRDATA$="a:clr"
420 OPEN CLRDATA$ FOR INPUT AS #1
430 FOR I=1 TO 87
440 INPUT #1, SET(I),XCENT(I),YCENT(I),Y(I),Z(I),Y2(I),Z2(I),ANGLE2(I),DELTY(I),
DELTYOY(I),LUM(I)
450 Y2(I)=Y2(I)*5/3:Z2(I)=Z2(I)*5/3
460 REM Y2(I)=Y2(I)*1/4:Z2(I)=Z2(I)*1/4
470 NEXT I
480 CLOSE #1
490 RETURN
500 END
510 LOCATE 10,5:PRINT "please wait — calculation proceeding".
520 TIC=0:FOR I= 0 TO 355 STEP 5
530 THETA=I*3.14159/180
540 TSIN=SIN(THETA):TCOS=COS(THETA)
550 PTEST1=1:BUG=Z2(CNT)-.0002:TIC=TIC+1
560 WHILE PTEST1
570 IF ABS(TCOS)<=.71 AND I>0 AND I<90 THEN XTEST=(TCOS/TSIN)*BUG:YTEST=BUG:GO
TO 690
580 IF ABS(TCOS)>.71 AND I>0 AND I<90 THEN XTEST=BUG:YTEST=(TSIN/TCOS)*BUG:GOTO
690
590 IF ABS(TCOS)<=.71 AND I>90 AND I<180 THEN XTEST=(TCOS/TSIN)*BUG:YTEST=BUG:G
TO 690
600 IF ABS(TCOS)>.71 AND I>90 AND I<180 THEN XTEST=-1*BUG:YTEST= -1*(TSIN/TCOS)*
BUG:GOTO 690
610 IF ABS(TCOS)<=.71 AND I>180 AND I<270 THEN XTEST= -1*(TCOS/TSIN)*BUG:YTEST=-
1*BUG:GOTO 690
620 IF ABS(TCOS)>.71 AND I>180 AND I<270 THEN XTEST= -1*BUG:YTEST= -1*(TSIN/TCOS
)*BUG:GOTO 690
630 IF ABS(TCOS)<=.71 AND I>270 THEN XTEST= -1*(TCOS/TSIN)*BUG:YTEST= -1*BUG:GOT
O 690
640 IF ABS(TCOS)>.71 AND I>270 THEN XTEST=BUG:YTEST=(TSIN/TCOS)*BUG:GOTO 690
650 IF I=0 THEN XTEST=BUG:YTEST=0:GOTO 690
660 IF I=180 THEN XTEST= -1*BUG:YTEST=0:GOTO 690
670 IF I=90 THEN XTEST=0:YTEST=BUG:GOTO 690
680 IF I=270 THEN XTEST=0:YTEST= -1*BUG:GOTO 690
690 THEDIST=(XTEST^2 + YTEST^2)^.5
700 UUU= XTEST*COS(ANGLE2(CNT)) - YTEST*SIN(ANGLE2(CNT)) + XTRANS
710 VVV= XTEST*SIN(ANGLE2(CNT)) + YTEST*COS(ANGLE2(CNT)) + YTRANS
720 UVXTEST=(4*UUU)/(-2*UUU + 12*VVV +3):UVYTEST=(9*VVV)/(-2*UUU + 12*VVV + 3)
730 IF CHOICE<3 THEN 800
740 TRIYI=TRIY:TRIXI=(UUU/VVV)*TRIYI
750 TRIZI=((1-UUU-VVV)/VVV)*TRIYI
755 IF TRIZI<0 THEN TRIZI=0
760 LSTEST=116*(TRIYT/LABYN)^.333 - 16
770 ASTEST=500*((TRIXT/LABXN)^.333 - (TRIYT/LABYN)^.333)
780 BSTEST=200*((TRIYT/LABYN)^.333 - (TRIZT/LABZN)^.333)
781 NWTRIY=TRIY*.15+TRIY
782 NWLSTAR=116*(NWTRIY/LABYN)^(1/3) - 16
783 DELTLS=ABS(NWLSTAR-LSTAR)
790 LABDE= ((ASTAR - ASTEST)^2 + (BSTAR - BSTEST)^2)^.5
791 LABDE2= ((DELTLS)^2 + (ASTAR - ASTEST)^2 + (BSTAR - BSTEST)^2)^.5
800 UVDIST=((UVXTEST-UTRANS)^2 + (UVYTEST-VTRANS)^2)^.5
810 P2= XTEST^2/Y2(CNT)^2 + YTEST^2/Z2(CNT)^2
820 IF P2>=1 THEN PTEST1=0
830 BUG=BUG+.0002
840 WEND
850 DXY(TIC)=THEDIST:DUV(TIC)=UVDIST:DLAB(TIC)=LABDE
851 ASTR(TIC)= ABS(ASTAR-ASTEST):BSTR(TIC)=ABS(BSTAR-BSTEST)
852 DLAB2(TIC)=LABDE2
860 REM *** test PRINT I,DXY(TIC)*****
870 NEXT I
880 REM *** CALCULATE AVERAGE DISTANCE ***
890 REM
```

```
900 SUMXY=0:SUMUV=0:SUMLAB=0:SUMAS=0:SUMBS=0
901 SUMLB2=0
910 FOR I=1 TO 72
920 SUMXY=SUMXY + DXY(I):SUMUV=SUMUV+DUV(I):SUMLAB=SUMLAB+DLAB(I)
921 SUMAS=SUMAS+ASTR(I):SUMBS=SUMBS+BSTR(I):SUMLB2=SUMLB2+DLAB2(I)
930 NEXT I
940 DXYAVG=SUMXY/72:DUVAVG=SUMUV/72:DLABAVG=SUMLAB/72
941 ASTRAV=SUMAS/72:BSTRAV=SUMBS/72:DLBAVG2=SUMLB2/72
950 REM *** GIVE CHISQ PROBABILITIES FOR VARIOUS AVG DISTANCES ***
960 IF DUMMY=1 THEN 1010
970 FOR I = 1 TO 13:READ ZZ(I),CHISQ(I):NEXT I
980 DATA .5,22,.7,30,.9,36,1.1,42,1.3,48,1.5,53,1.7,57
990 DATA 1.9,61,2.1,65,2.3,68,2.5,71,2.7,74,2.9,77
1000 F31X$=".#### ,";F31Y$=".####"
1010 LPRINT "1931 x,y SPECIFICATION = ";
1020 LPRINT USING F31X$;XTRANS;
1030 LPRINT USING F31Y$;YTRANS
1040 LPRINT "1976 u',v' SPECIFICATION = ";
1050 LPRINT USING F31X$;UTRANS;
1060 LPRINT USING F31Y$;VTRANS
1065 IF CHOICE<3 THEN 1110
1070 LPRINT "1976 L*,a*,b* SPECIFICATION = ";
1080 LPRINT USING "###.#, ";LSTAR;
1090 LPRINT USING "###.#, ";ASTAR;
1100 LPRINT USING "###.#";BSTAR
1105 LPRINT "Source Illuminant = ";DIL$
1110 LPRINT:LPRINT   "THE AVERAGE XY DISTANCE = ";
1120 LPRINT USING " #.####"; DXYAVG
1130 LPRINT:LPRINT "THE AVERAGE UV DISTANCE = ";
1140 LPRINT USING " #.####";DUVAVG
1145 IF CHOICE<3 THEN 1170
1150 LPRINT:LPRINT "THE AVERAGE a*b* DELTA E = ";
1160 LPRINT USING " ##.##";DLABAVG
1170 REM
1180 LPRINT:LPRINT
1190 LPRINT "THE FOLLOWING LIST PROVIDES AN ESTIMATE OF THE PERCENT OF"
1200 LPRINT "THE TIME THAT THE GIVEN COLOR DIFFERENCE WILL BE SEEN BY"
1210 LPRINT "AN AVERAGE OBSERVER"
1220 LPRINT:LPRINT
1225 IF CHOICE=3 THEN 1700
1230 LPRINT "  DISTANCE (xy)     DISTANCE (uv)       PERCENT"
1240 LPRINT "  ________            ________            _______"
1250 FF1$="   .####";FF2$="            .####";FF3$="            ##.%"
1260 FOR I=1 TO 13
1270 LPRINT USING FF1$; DXYAVG+ZZ(I);
1280 LPRINT USING FF2$; DUVAVG+ZZ(I);
1290 LPRINT USING FF3$;CHISQ(I)
1300 NEXT:IF DUMMY=1 THEN 1340
1310 FOR I = 1 TO 14:READ ZZL(I),NORM(I):NEXT I
1320 DATA .28,22,.38,30,.47,36,.56,42,.64,46,.72,53,.79,57
1330 DATA .86,61,.94,65,1.0,68,1.10,73,1.3,81,1.6,89,2.0,95.
1340 LPRINT:LPRINT
1342 IF CHOICE=3 THEN 1460
1345 LPRINT USING "LUMINANCE SPECIFICATION = ###.## cd/m^2";FFLL
1346 LPRINT
1347 LPRINT USING "RECOMMENDED LUMINANCE TOLERANCE = ###.## cd/m^2";FFLL*.15
1348 LPRINT
1350 LPRINT "THE FOLLOWING LIST PROVIDES AN ESTIMATE OF THE PERCENT OF"
1360 LPRINT "THE TIME THAT THE GIVEN LUMINANCE DIFFERENCE WILL BE DETECTED"
1370 LPRINT "BY AN AVERAGE OBSERVER"
1380 LPRINT:LPRINT
1390 LPRINT "  LUMINANCE DIFFERENCE (cd/m^2)         PERCENT"
1400 LPRINT "  _____________________________         _______"
1410 FF1$="    ####.##";FF3$="            ##.%"
1420 FOR I=1 TO 14
1430 LPRINT USING FF1$; FFLL*.15*ZZL(I);
1440 LPRINT USING FF3$;NORM(I)
1450 NEXT
1460 CLS
1470 PRINT:INPUT "DO YOU WISH TO INPUT ANOTHER SPECIFICATION?",ANS$
1480 IF ANS$="NO" OR ANS$="N" OR ANS$="n" THEN 1500
1490 DUMMY=1:CLS:RUN "a:color2"
1500 END
1510 CLS:LOCATE 15,20,0:PRINT "enter reference illuminant (A,C,D65,F3,PIPE,VF)"
1520 LOCATE 17,25,0:INPUT " ",DIL$
1525 CLS:LOCATE 15,20,0:PRINT "enter the " CHOICE$(CHOICE)" below (e.g., 34.,-1.4,-4.5)"
1530 IF DIL$="A" OR DIL$="a" THEN LABXN=109.81:LABYN=100:LABZN=35.55
1540 IF DIL$="C" OR DIL$="c" THEN LABXN=98.04:LABYN=100:LABZN=118.12
1550 IF DIL$="D65" OR DIL$="d65" THEN LABXN=95.03:LABYN=100:LABZN=108.79
1560 IF DIL$="F3" OR DIL$="f3" THEN LABXN=94.97:LABYN=100:LABZN=89.58939
```

```
1562 IF DIL$="PIPE" OR DIL$="pipe" THEN LABXN=122.43:LABYN=100:LABZN=17.55
1564 IF DIL$="VF" OR DIL$="vf" THEN LABXN=59.27:LABYN=100:LABZN=72.28
1570 REM
1580 LOCATE 17,25,0:INPUT " ",LSTAR,ASTAR,BSTAR
1590 TRIY=(((LSTAR+16)/116)^3)*LABYN
1600 TRIX=((ASTAR/500+ (TRIY/LABYN)^(1/3))^3)*LABXN
1610 TRIZ=((BSTAR/200 - (TRIY/LABYN)^(1/3))^3)* (-1*LABZN)
1620 XTRANS=TRIX/(TRIX+TRIY+TRIZ):YTRANS=TRIY/(TRIX+TRIY+TRIZ)
1630 UTRANS=(4*XTRANS)/(-2*XTRANS + 12*YTRANS + 3):VTRANS=(9*YTRANS)/(-2*XTRANS
     + 12*YTRANS +3)
1640 GOTO 300
1700 REM
1710 LPRINT " DISTANCE (a*b* color plane)         PERCENT"
1720 LPRINT " _______________________              _______"
1730 FF1$="   ##.##";FF3$="                                       ##. %"
1740 FOR I=1 TO 13
1750 LPRINT USING FF1$;DLABAVG+22(I);
1760 LPRINT USING FF3$;CHISQ(I)
1770 NEXT
1780 NWTRIY=TRIY*.15+TRIY
1790 NWLSTAR=116*(NWTRIY/LABYN)^(1/3) - 16
1795 DELTLS=ABS(NWLSTAR-LSTAR)
1796 LPRINT
1797 LPRINT USING "average luminance distance (L* units) = ##.#";DELTLS
1798 REM NEWDE2=(ASTRAV^2 +BSTRAV^2+DELTLS^2)^(.5)
1799 REM
1800 LPRINT "average a* distance =  ";
1805 LPRINT USING "  ##.##";ASTRAV
1810 LPRINT "average b* distance =  ";
1815 LPRINT USING "  ##.##";BSTRAV
1818 LPRINT
1820 LPRINT USING "OVERALL L*a*b* DELTA E VALUE = ##.#";DLBAVG2
1900 GOTO 1340
```

The embodiments of the invention in which an exclusive property or privilege is claimed are defined as follows:

1. A method for manufacturing displays comprising the steps of:
    (a) developing a target color space data for a display area;
    (b) comparing the target color space data to reference data generally adapted to size and spatial characteristics of the display;
    (c) developing a color value tolerance for the target color space data in response to the comparison;
    (d) developing, independent of the color value tolerance, a luminance value tolerance in response to the target color space data;
    (e) constructing production displays;
    (f) measuring color space data of the production displays
    (g) first comparing the color space data of the production displays to the target color space data and the color value tolerance;
    (h) altering a color process in response to the first comparison if the first color space data is not within the color value tolerance of the target color space data;
    (i) second comparing the color space data of the production displays to the target color space data and the luminance value tolerance;
    (j) altering lighting in response to the second comparison if the first color space data is not within the luminance value tolerance of the target color space data; and
    (k) repeating steps (g), (h), (i) and (j) until the color space data is within the color value tolerance and the luminance value tolerance of the target color space data.

* * * * *